United States Patent [19]

Kadota

[11] Patent Number: 4,991,132

[45] Date of Patent: Feb. 5, 1991

[54] APPARATUS FOR EXECUTING DIVISION BY HIGH-SPEED CONVERGENCE PROCESSING

[75] Inventor: Hiroshi Kadota, Osaka, Japan

[73] Assignee: Matsushita Electric Industrial Co., Ltd., Japan

[21] Appl. No.: 285,605

[22] Filed: Dec. 15, 1988

[30] Foreign Application Priority Data

Dec. 17, 1987 [JP] Japan .................................. 62-319442
Feb. 12, 1988 [JP] Japan .................................. 63-31232

[51] Int. Cl.⁵ ............................................. G06F 7/52
[52] U.S. Cl. ............................................. 364/765
[58] Field of Search ............... 364/761, 764, 765, 766, 364/767

[56] References Cited

U.S. PATENT DOCUMENTS

| | | | |
|---|---|---|---|
| 4,364,115 | 12/1982 | Asai | 364/765 |
| 4,481,600 | 11/1984 | Asai | 364/765 |
| 4,636,973 | 1/1987 | Cantwell | 364/764 |
| 4,716,538 | 12/1987 | Mills et al. | 364/765 |
| 4,725,974 | 2/1988 | Kanazawa | 364/765 |
| 4,744,045 | 5/1988 | Mills et al. | 364/765 |

Primary Examiner—Dale M. Shaw
Attorney, Agent, or Firm—Lowe, Price, LeBlanc, Becker & Shur

[57] ABSTRACT

A division apparatus for executing division operation by means of a convergence algorithm, the apparatus including a ROM having a table of inverse values stored therein which respectively correspond to all possible values of a first approximation for a divisor. Division is executed by reading out a corrsponding inverse value from the ROM, and performing a small number of successive multiplication operations on the divided and this inverse value, in conjunction with simple addition or subtraction operations which are determined by the specific form of the alogorithm which is used. A considerable increase in division speed is attainable, with a simple system configuration.

13 Claims, 7 Drawing Sheets

APPARATUS FOR EXECUTING DIVISION BY HIGH-SPEED CONVERGENCE PROCESSING

BACKGROUND OF THE INVENTION

When arithmetic operations are executed by digital processing, division operations require a greater amount of time than any of the other three types of arithmetic operation. It has been proposed in the prior art to reduce the time required for division operation by executing division using a sequential processing method, whereby a simple algorithm is utilized such that during each of sequential processing steps, the magnitude of the divisor and that of the dividend (or of the partial residue) are compared, and the type of computation that is executed in the succeeding step is determined based on the results of that comparison. With such a method, as for the usual method of multiplication processing, a number of parallel operation circuits are utilized. However it is found in practice that it is difficult to utilize such a division method.

For this reason, a method of convergence division has been proposed in the prior art, which utilizes a high speed multiplier and an adder/subtractor. In the following description of this prior art method, and of embodiments of the present invention given hereinafter, it will be assumed that both the divisor and dividend (or partial residue) are normalized numbers, where the term "normalized number" as used herein refers to a fixed point number such as the fixed point portion (i.e. mantissa) of a number expressed in floating-point form. It will further be assumed that the divisor (designated in the following as D) is of the form 0.1xxxx...s, having N valid digits, where N is a finite number and where "x" represents a digit value which can be either 0 or 1. In this case, the divisor D can be expressed as $(1-D_m)$, where $D_m$ is a value which is equal to or smaller than 0.1. For the case in which $D_m=0.1$, the quotient can be made equal to twice the dividend (or partial residue). With binary number operations, this can be done simply by a one-digit left-shift operation, so that it is not necessary to perform an actual division operation for this special case. However even if that special case is excluded from the following description, the description is still generally applicable.

Specifically, the division operation A/D (where A designates the dividend) can be mathematically transformed as follows:

$$\begin{aligned} A/D &= A/(1-D_m) = A(1+D_m)/\{(1-D_m)(1+D_m)\} \\ &= A(1+D_m)(1+D_m^2)/\{(1-D_m)(1+D_m)(1+D_m^2)\} \\ &= A(1+D_m)(1+D_m^2)/(1-D_m^4) \\ &= A(1+D_m)(1+D_m^2)(1+D_m^4)(1+D_m^8)(1+D_m^{16})(1+D_m^{32})/(1-D_m^{64}) \\ &= \frac{A}{(1-D_m^{64})} \prod_{n=1}^{6} (1+D^{2(n-1)}) \end{aligned}$$

Generally, the number N of valid digits of the numeric value system is in the range $48 < N < 52$, for the case of double precision floating-point expression. Assuming that N is 52, then value $D_m^{64}$ in the denominator will be smaller than the lower limit set by the number of digits of N. Thus, $D_m^{64}$ is effectively equal to zero. The following approximation is therefore true:

$$A/D \approx A \prod_{n=1}^{6} (1+D_m^{2(n-1)})$$

Thus, the division computation can be executed by adding one to the result of each computation of $D_m$ raised to the power $2^{(n-1)}$, with this addition being performed for each item in the expression (in this case, therefore, six addition operations are required).

In the above, $D_m^{2n}$ is obtained as the square of $D_m^{2(n-1)}$. Since the most significant digit of $D_m$ will be zero, $(1+D_m^{2n})$ can be obtained simply by changing that most significant digit to a value of one. In that case, it can be considered that in practice a negligible amount of computation time is required to obtain $(1+D_m^{2n})$. thus, division can be considered to be executed by one subtraction operation for obtaining $D_m$, and 11 multiplication operations (i.e. the 5 multiplication operations for obtaining $D_m^2$ to $D_m^{32}$ and the six multiplication operations for the six items of equation (2)).

If extremely high speed multipliers are used, the total multiplication time required for the above operations is of the order of 1 to 2 microseconds, so that a comparatively high speed division apparatus can be implemented.

Such a prior art convergence type of division apparatus, made up of a subtractor, multipliers, and a control circuit, can be made comparatively small in circuit scale. However due to the large number of multipliers which are used, it is difficult to provide an extremely high speed division apparatus by such a method.

SUMMARY OF THE INVENTION

It is an objective of the prevent invention to overcome the problems of the prior art described above, by providing a division apparatus which is capable of executing division at high speed and with high accuracy, and whereby it is not necessary to utilize large-scale circuits dedicated to division operations in order to execute such high-speed division. To achieve this objective, a division apparatus according to the present invention executes division by convergence, employing multipliers and adders or subtractors, by utilizing a set of inverse approximation values for divisors, stored as a table in a ROM (read-only memory). The invention thereby enables a compact high-speed division apparatus to be provided.

Essentially, a division apparatus according to the present invention, for dividing a divisor D by a dividend A (the divisor and dividend each being a normalized numeric value expressed in a base R numeric system and having N effective digits with the most significant digit value other than zero) comprises:

means for separating the divisor D into a first portion $D_O$ comprising the M high order digits of the divisor, as a first approximation value for the divisor, and a second portion $D_1$ comprising the (N−M) low order digits of the divisor, where M and N are integers with M being greater than zero and less than M;

memory means having storing a table comprising $(R−1) \times R^{(M−1)}$ inverse values corresponding respectively to all possible values of the numeric approximation $D_O$;

control means operable for accessing the inverse value table in accordance with the high order M digits of the divisor, to produce as output from the memory means a corresponding one of the inverse values and, high-speed convergence division means coupled to receive that corresponding inverse value, the second portion $D_1$, and the dividend A, and comprising multiplier means having a computation precision corresponding to at least N effective digits;

wherein the control means further controls the convergence division means to execute successive digital processing steps in accordance with a predetermined convergence division algorithm for obtaining a division quotient A/D.

A division apparatus according to the present invention is characterized in executing successive multiplication operations based on a suitable inverse approximation value (selected form a stored table, in accordance with the value of the divisor), and hence employs a basically different form of operation to that of the prior art apparatus described above.

DESCRIPTION OF PREFERRED EMBODIMENTS

Figure 1:
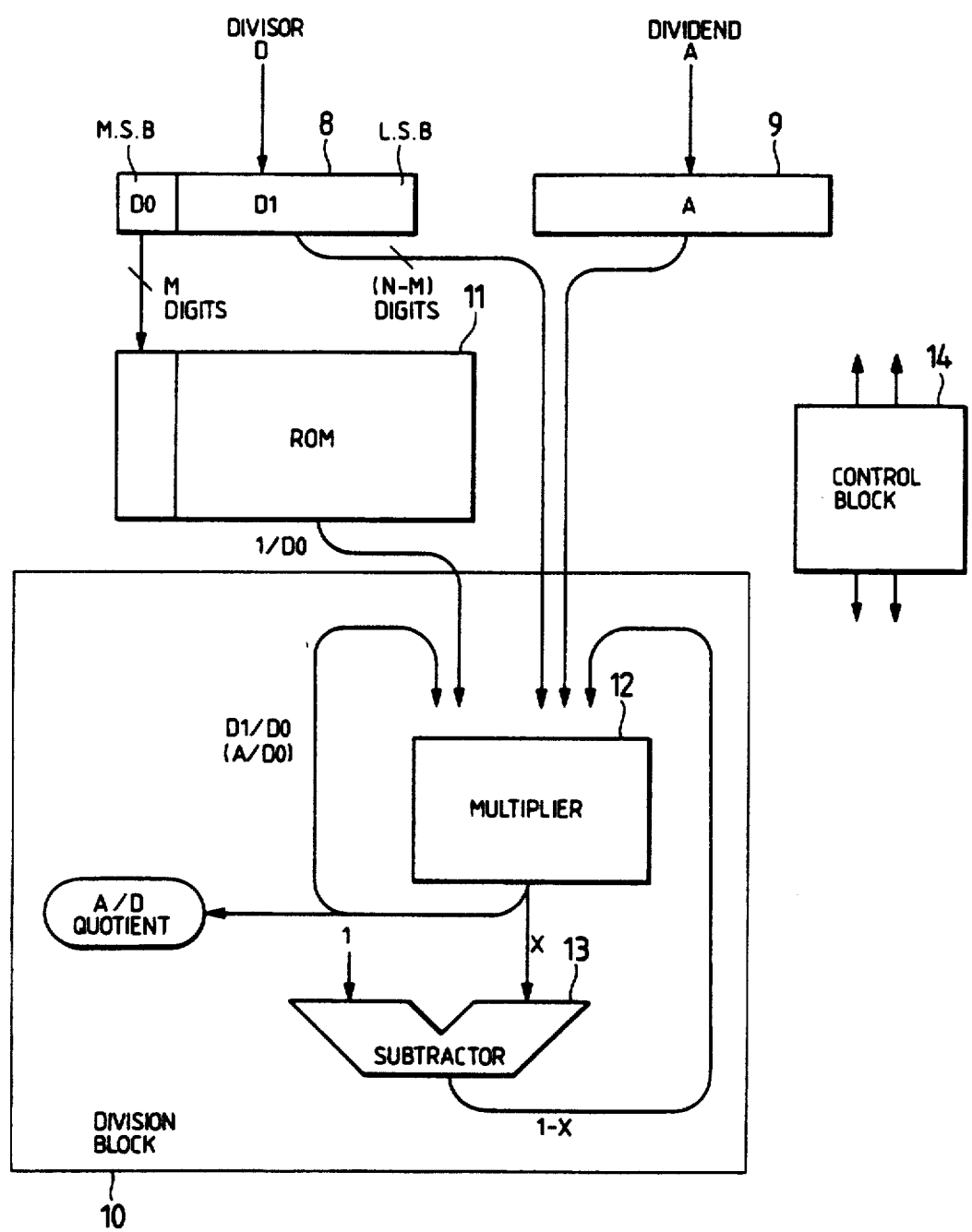
FIG. 1 is a block diagram showing the basic configurations of a first embodiment of a division apparatus according to the present invention, in which a convergence division block executes subtraction as well as multiplication operations; p

In the following description, as in the background information given hereinabove, it will be assumed that each of the divisor (D) and dividend (A) is a normalized number which has a finite number N of valid digits, with the most significant digit of the divisor D being a fixed value other than zero. FIG. 1 is a general block diagram of a first embodiment of a division apparatus according to the present invention. In FIG. 1, a divisor (D) and a dividend (A) are respectively held in registers 8 and 9 during a division operation for obtaining the quotient A/D as described in the following. Appropriate outputs are produced from the register 8 for splitting the divisor into two numeric values $D_0$ and $D_1$. $D_0$ is a first approximation value having N valid digits, with the M high order digits of $D_0$ being identical to those of the divisor D, and the low order (N−M) digits of $D_0$ all being fixed as zero. $D_1$ is the difference between D and $D_0$, i.e. is a value having N valid digits, with the high order M bits all being fixed as zero, and the low order (N-31 M) bits being identical to those of the divisor D.

The relationships between the divisor D, $D_0$ and $D_1$ are thus as follows:

$$D = \{d_N d_{(N-1)} \cdots d_{(N-M+1)} d_{(N-M)} \cdots d_2 d_1\}$$

$$D_0 = \{d_N d_{(N-1)} \cdots d_{(N-M+1)} 00 \cdots 00\}$$

$$D_1 = \{00 \cdots 0 d_{(N-M)} \cdots d_2 d_1\}$$

In the above, d signifies digit number.

A multiplier 12 and subtractor 13 serve to configure a high-speed convergence division circuit bloc k 10. A control circuit block 14 controls operation of this division circuit block 10, and of a ROM [11] used for storing a table of inverse values (1/ $D_0$), for sequentially executing processing steps described hereinbelow. Thus in this embodiment, each of the approximation values stored in the ROM [11] is the direct inverse 1/ $D_0$ of a divisor approximation value $D_0$.

This embodiment executes computation in accordance with the following approximation equation:

$$A \div D = \frac{A}{D_0 + D_1} (D_0 >> D_1) \qquad (3)$$

$$= \frac{A}{D_0(1 + D_1/D_0)}$$

$$\approx \left(\frac{A}{D_0}\right) \cdot \left\{ 1 - \left(\frac{D_1}{D_0}\right) + \left(\frac{D_1}{D_0}\right)^2 - \left(\frac{D_1}{D_0}\right)^3 + \left(\frac{D_1}{D_0}\right)^4 \right\}$$

$$= \left(\frac{A}{D_0}\right) \cdot \left\{ 1 - \frac{D_1}{D_0}\left(1 - \frac{D_1}{D_0}\left(1 - \frac{D_1}{D_0}\left(1 - \frac{D_1}{D_0}\right)\right)\right) \right\}$$

In equation (3) above, $D_0$ is a first approximation value for the divisor D. In the following description and the appended claims, the term "high order" digits refers to a set of digits extending from (and including) the most significant digit of a number, with successively decreasing significance. The term "low order" digits refers to a set of digits extending from (and including) the least significant digit of a number, with successively increasing significance. All of the possible numeric values for the inverse (1/$D_0$) of this first approximation value are stored (prior to division computation) as a table in the ROM 11. The equation (3) above contains a term which is raised to the power 4. However, as described hereinafter if M is made equal to 12 or more, then this term becomes close to zero, and hence can be omitted.

It should be noted that although it is assumed in the above that all of the low-order (N−M) digits of $D_0$ are made equal to zero, this is not essential to the invention, and it would be equally possible to select some other fixed value for these low-order digits.

A specific computation sequence for this embodiment, using the approximation equation (3) will be given in the following. It will be assumed that the divisor D is a normalized binary number, which has 52 valid digits and is of the form 0.1xxxx...x as described hereinabove, and that M is equal to 12, so that the 12 high order digits of $D_0$ are identical to the 12 high order bits of the divisor D (and with the most significant digit having a value fixed as 1, as described hereinabove). Thus, $D_0$ can take $2^{11}$ (i.e. $2^{(M-1)}$) possible different values, which is a total of 2048 values. The RAM 11 must therefore have a storage capacity of at least 2048 words ×52 bits, i.e. approximately 100 K bits. Generally speaking, the access time of the ROM will be approximately one half of the time required to execute a 52-bit multiplication operation. The computation operations which are executed by the convergent division block of this embodiment are as follows:

1. The normalized divisor (D), having N digits, is divided into $D_0$ and $D_1$.

The inverse value table stored in the ROM 11 is accessed in accordance with the value of $D_0$. That is, data are read out from ROM 11, from the address corresponding to the (M−1) high order bits of the divisor D (and hence of $D_0$). (Step 1)

2. The product $D_1/D_0$ of the inverse value $1/D_0$ and the value $D_1$, (consisting of the low order (N−M) bits of the divisor D) is obtained by the multiplier 12. (step 2)

3. The value $D_1/D_0$ is inputted to the subtractor 13, to obtain the value $(1-D_1/D_0)$. (Step 3)

The time required for Step 3 is approximately one half of the time required to execute a multiplication operation.

4. The result obtained in the immediately preceding step is multiplied by $D_1/D_0$, by the multiplier 12. (Step 4).

5. The result obtained in the preceding step is subtracted from one, by the subtractor 13. (Step 5).

The sequence of step 4 followed by step 5 is repetitively executed a requisite number of times (i.e. 3 times, to compute to a desired degree of accuracy in accordance with the approximation equation (3) above). The result of the first repetition of steps 4 and 5 will be $(1-D_1/D_0(1-D_1/D_0))$, the result of the second repetition will be $(1-D_1/D_0(1-D_1/D_0(1\ D_1/D_0)))$, and the result of the third repetition will be $(1-D_1/D_0(1-D_1/D_0(1-D_1/D_0(1\ D_1/D_0))))$.

6. The product $A/D_0$ of the inverse value $1/D_0$ and the divisor A is obtained by the multiplier 12. (Step 5).

7. The final result obtained from the repetitions of steps 4, 5 is multiplied by the product $A/D_0$, and the result is outputted as the desired quotient (A/D).

The above processing operations, and the respective amounts of time taken for these, can be summarized as follows:

Number of 52-digit multiplication operations : 6

Number of 52-digit subtraction operations : 4 (time required is equivalent to that for 2 multiplication operations).

Number of ROM read-out operations: 1 (time required is equivalent to that for 0.5 multiplication operation).

Thus, if the processing times are converted to be expressed in terms of the time required for a multiplication operation, the total time required to execute division is equivalent to 8.5 multiplication operations. With the prior art convergence division method described hereinabove, one subtraction operation and 11 multiplication operations are required, i.e. the total time required to execute division is equivalent to a total of 11.5 multiplication operations. Thus, this embodiment of the present invention provides an improvement in division speed which can be expressed as a reduction in the time required to execute division by an amount equivalent to 3 multiplication operations.

It should be noted that the sequence of the operation steps 1 to 7 above is given only as an example. This is true of the remaining embodiments, and the operation step sequences set out in the appended claims. So long as it is ensured that each operand required in an operation step is computed or otherwise obtained prior to that operation step, variations of the described step sequences are possible, so that the described sequences should not be understood in a limiting sense.

Figure 2:
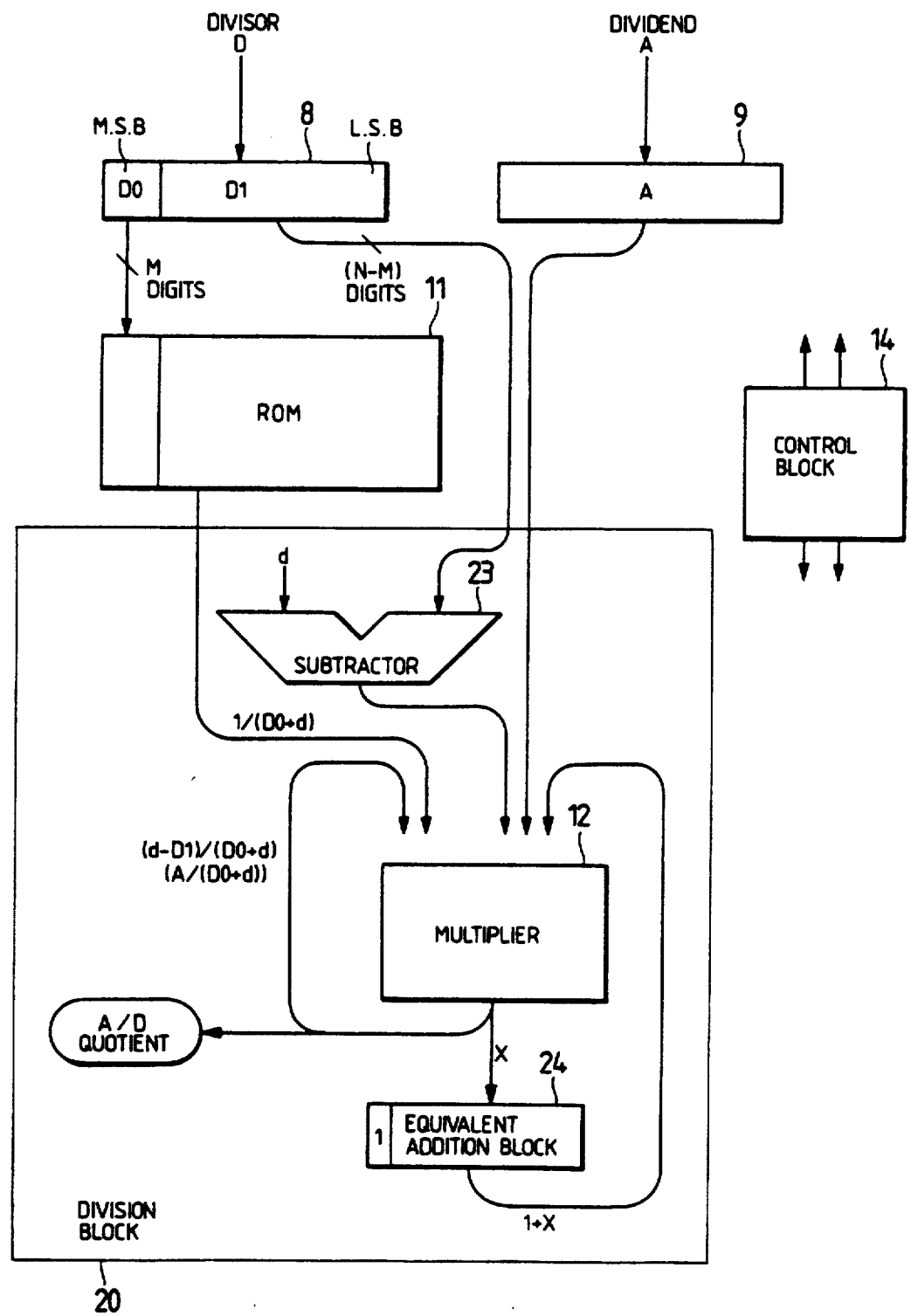
FIG. 2 shows a second embodiment, in which the convergent division block executes both subtraction and "addition of one", in addition to multiplication.

A second embodiment of the invention will be described referring to FIG. 2, in which circuit blocks corresponding to those of FIG. 1 are indicated by corresponding reference numerals. Further description of these will be omitted. This embodiment differs from that of FIG. 1 in that a high speed convergence division circuit block 20, in addition to containing a subtractor 23 and a multiplier 12, also includes a circuit block 24 which functions to effectively add one to the most significant digit position of a small number, i.e. a number whose most significant digit is known to be 0. Thus, the function of the circuit block 24 is executed simply by changing the most significant digit of a number inputted thereto from 0 to 1, with no actual addition operation being necessary, and with no computation time being required. Circuit block 24 will therefore be referred to as an equivalent addition block.

The second embodiment utilizes the following approximation equation:

$$A/D = \frac{A}{(D_0 + d)} \cdot \left\{ 1 + \frac{(d - D_1)}{D_0 + d} + \left(\frac{(d - D_1)}{D_0 + d}\right)^2 + \left(\frac{(d - D_1)}{D_0 + d}\right)^3 + \left(\frac{(d - D_1)}{D_0 + d}\right)^4 \right\} \quad (4)$$

$$= \frac{A}{(D_0 + d)} \cdot \left\{ 1 + \left(\frac{d - D_1}{D_0 + d}\right) \cdot \left(1 + \left(\frac{d - D_1}{D_0 + d}\right) \cdot \left(1 + \left(\frac{d - D_1}{D_0 + d}\right) \cdot \left(1 + \left(\frac{d - D_1}{D_0 + d}\right)\right)\right)\right)\right\}$$

In the above, as for the previous embodiment, the primary approximation value $D_0$ consists of the M high order digits of the divisor D, with the lower (N−M) digits of $D_0$ being zero. The value d in the approximation equation (4) above is a number in which all of the digits other than the $M^{th}$ digit are 0, and the $M^{th}$ digit is 1, i.e.

$$d = \ldots .10 \ldots .00)$$

In this way, the value $(D_0+d)$ that is used as a primary approximation value for the divisor D in approximation equation (4) is equivalent to the value $D_0$ with the low order (N−M) digits rounded-off.

In this embodiment, the inverse values that are stored in a table in the ROM 11, respectively corresponding to the various possible values of the first approximation value $D_0$ of the divisor D, each is a value $1/(D_0+d)$, where d is as defined hereinabove.

The operation steps for this embodiment are as follows:

1. As for the first embodiment, the divisor D is separated into $D_0$ and $D_1$. The value $(d-D_1)$ is obtained by the subtraction 23. (Step 1)

2. The inverse value table stored in the ROM 11 is accessed in accordance with the value of $D_0$, to read out from ROM 11 the corresponding value of $1/(D_0+d)$. (Step 2)

3. $1/(D_0+d)$ is multiplied by $(d-D_1)$, by the multiplier 12 (Step 3).

4. 1 is added to the result of step 3, by the equivalent addition block 24. (Step 4). (The processing time required for this is effectively zero, for the reasons set out above).

5. The result obtained in the immediately preceding step is multiplied by $(d-D_1)/(D_0+d)$, by the multiplier 12. (Step 5).

6. 1 is added to the result obtained in the preceding step, by the equivalent addition block 24. (Step 6).

7. The sequence of step 5 followed by step 6 is repetitively executed a requisite number of times (e.g 3 times, in this example). (Step 7)

8. The product $A/(D_0+d)$ of the inverse value $1/(D+d)$ and the divisor A is obtained by the multiplier 12. (Step 8).

9. The final result obtained from the repetition step 7 is multiplied by the product $A/(D_0+d)$, and the result is outputted as the desired quotient $(A/D)$. (Step 9).

The above processing operations, and the respective amounts of time required, can be summarized as follows:

Number of 52-digit multiplication operations : 6

Number of 52-digit subtraction operations : 1 (time required is equivalent to that for 0.5 multiplication operation, but this time is overlapped by the RAM access time and hence can be considered to be effectively zero).

Number of ROM read-out operations: 1 (time required is equivalent to that for 0.5 multiplication operation).

Thus, if the processing times are expressed in terms of the time required for a multiplication operation, the total time required to execute division is equivalent to 6.5 multiplication operations. It can therefore be understood that a very high speed of division operation can be attained with this embodiment.

Figure 3:
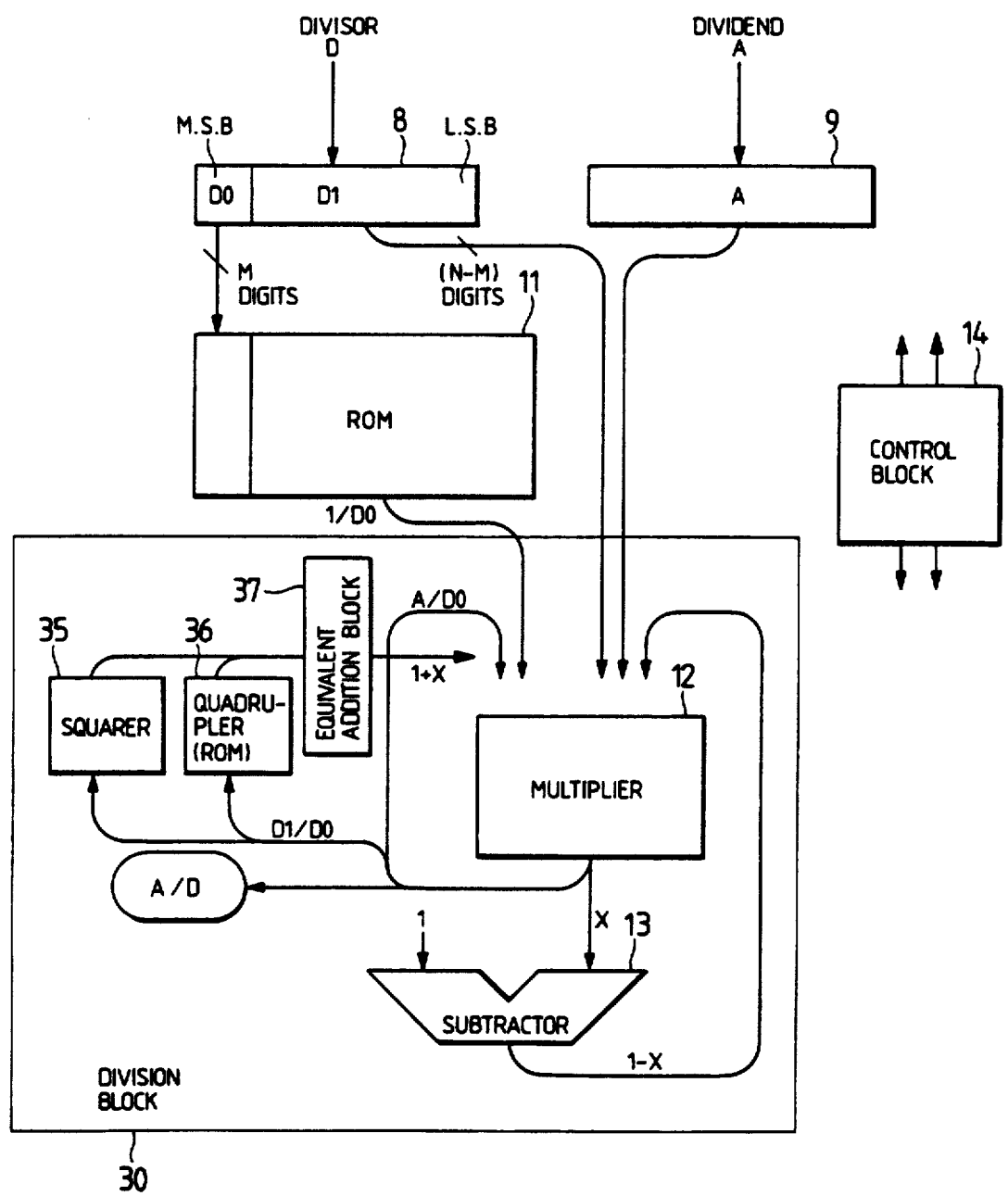
FIGS. 3 and 4 show third and fourth embodiments, respectively, in which the convergent division block executes squaring and raising to the fourth power, in addition to subtraction and multiplication; and, FIGS. 5, 6 and 7 show fifth, sixth and seventh embodiments, respectively, in which the convergent division block executes inversion of low order bits of the divisor to obtain a value $D'_1$ which is utilized in convergent division processing.

A third embodiment of the present invention will be described, referring to FIG. 3. This is a modification of the first embodiment of FIG. 1, with the high-speed convergence division block 30 further including a circuit block for obtaining the square of a number inputted thereto (referred to in the following as a squarer) 35, and a circuit 36 for raising a number inputted thereto to the power 4 (referred to in the following as a quadrupler). In this embodiment, the quadrupler 36 is configured as a ROM which contains a table of values, which is accessed in accordance with the value of a number, in order to obtain as output that value raised to the power 4. The division block 30 further includes an equivalent addition block 37, for adding 1 to the most significant digit of a small number, as described for the previous embodiment, by setting the most significant digit to 1.

This embodiment utilizes the following approximation equation, which is a modification of the approximation equation (3) of the first embodiment:

$$A/D = A \cdot (1/D_0) \cdot (1-D_1/D_0) \cdot (1+(D_1/D_0)^2) \cdot (1+(D_1/D_0)^2) \quad ..(5)$$

In this embodiment, the multiplier 12 multiplies to a precision of 28 digits, i.e. $(52-12\times2)$ bits. The squarer 35, configured as a ROM, provides a precision of 4 digits, i.e. $(52-12\times4)$ bits. As in the first embodiment, the ROM 11 contains a table of inverse values of the form $(1/D_0)$ The steps of the division operation processing sequence are as follows:

1. Read out $(1/D_0)$ from the inverse value ROM 11. (Step 1)

2. Compute the product $D_1 \cdot (1/D_0)$ by the multiplier 12. (Step 2)

3. Compute $A \cdot (1/D_0)$ by the multiplier 12. (Step 3)

4. Compute $(D_1/D_0)^2$ by the squarer ROM 35, and compute $(D_1/D_0)^4$ by the quadrupler ROM 36, then compute $1-(D_1/D_0)$ by the subtractor 13. (Step 4)

5. Compute $(A/D_0) \cdot (1+(D_1/D_0)^4)$ by the multiplier 12. (Step 5).

It should be noted that no processing time is required to compute $(1+(D_1/D_0)^4)$.

6. Compute $(1-(D_1/D_0))(1+(D_1/D_0)^2)$, by the multiplier 12. (Step 6)

7. Compute $\{(A/D_0)(1+(D_1/D_0)^4)\} \cdot \{(1-(D_1/D_0))(1+(D_1/D_0)^2)\}$. (Step 7)

For brevity of description, the operation of the equivalent addition block 37 is omitted from the above processing steps. As described for the previous embodiments, this consists in simply setting the most significant digit of a low-value number passed therethrough to 1, i.e. to obtain $(1+(D_1/D_0)^2)$, etc.

The above processing operations, and the respective amounts of time required, can be summarized as follows:

Number of 52-digit multiplication operations : 6

Number of 52-digit subtraction operations : 1 (time required is overlapped by the ROM access time and hence can be considered to be effectively zero). Number of ROM read-out operations 1 (time required is equivalent to that for 0.5 multiplication operation).

Thus, if the processing times are expressed in terms of multiplication operations, the total time required to execute division is equivalent to 6.5 multiplication operations.

It should be noted that it would be equally possible with this embodiment to utilize the multiplier 12 to implement the function of the squarer ROM 35.

Figure 4:
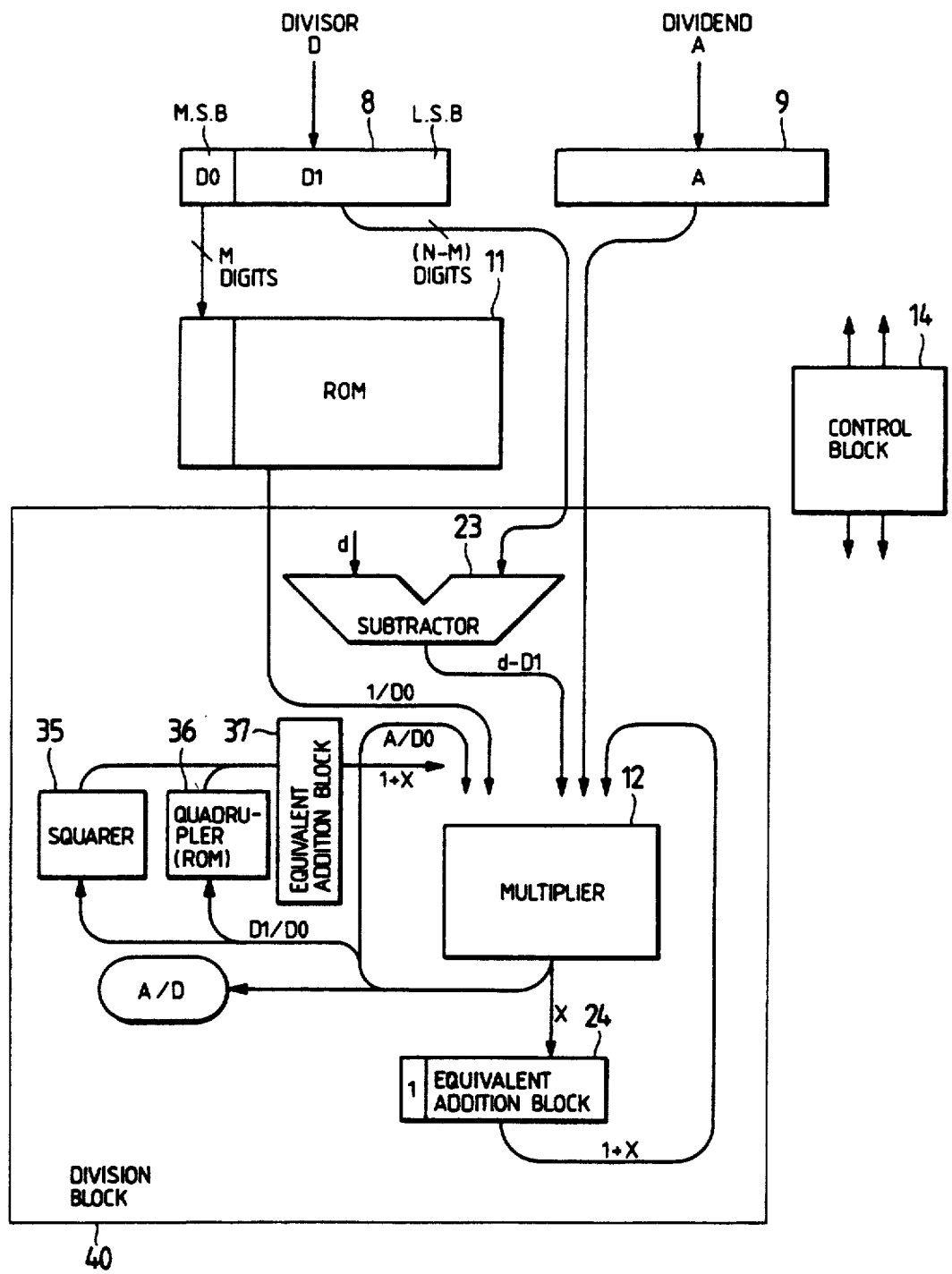

A fourth embodiment of the invention will be described referring to FIG. 4. This is a modification of the second embodiment of FIG. 2, with the high-speed convergence division block 40 further including a squarer 35 and a quadrupler 36, together with a equivalent addition block 37, in addition to the multiplier 12 and subtractor 13.

The processing operation of this embodiment is based on the following approximation equation, $$A/D = \frac{A}{(D_0+d)-(d-D_1)}$$
$$= A \cdot \left(\frac{1}{D_0+d}\right) \cdot \left(1+\left(\frac{d-D_1}{D_0+d}\right)\right) \cdot$$
$$\left(1+\left(\frac{d-D_1}{D_0+d}\right)^2\right) \cdot \left(1+\left(\frac{d-D_1}{D_0+d}\right)^4\right)$$

The value d is defined as described hereinabove for the second embodiment of FIG. 2, and the table of values stored in the ROM 11 consists of values of $1/(D_0+d)$.

The steps of the division operation processing sequence are as follows:

1. Read out $(1/(D_0+d))$ from the inverse value table stored in ROM 11, and compute $(d-D_1)$ by the subtraction 23. (Step 1)
2. Compute $(d-D_1) \cdot \{1/(D_0+d)\}$ by the multiplier 12. (Step 2)
3. Compute $A \cdot \{1/D_0+d)\}$, by the multiplier 12. (Step 3)
4. Compute $$\left(\frac{d-D_1}{D_0+d}\right)^2, \left(\frac{d-D_1}{D_0+d}\right)^4.$$

by the squarer ROM 35 and quadrupler ROM 36. (Step 4)

5. Compute $$\left(\frac{A}{D_0+d}\right) \cdot \left(1 + \frac{d-D_1}{D_0+d}\right)^4,$$

by the multiplier 12. (Step 5)

6. Compute $$\left(1 + \frac{d-D_1}{D_1+d}\right) \cdot \left(\frac{d-D_1}{D_0+d}\right)^2.$$

by the multiplier 12. (Step 6)

7. Compute $$\left\{\left(\frac{A}{D_0+d}\right) \cdot \left(1 + \left(\frac{d-D_1}{D_0+d}\right)^4\right)\right\} \cdot$$

$$\left\{\left(1 + \frac{d-D_1}{D_0+d}\right)\left(1 + \left(\frac{d-D_1}{D_0+d}\right)^2\right)\right\}$$

by the multiplier 12. (Step 7)

With this embodiment, the total division operation time is equivalent to 6.5 multiplication operations.

As will be clear from the above description of the first through fourth embodiments of the invention, the time required to execute the computation operations for obtaining a quotient is substantially reduced by comparison with the prior art. It can be understood that simply by adding a single ROM for storing a table of inverse values, to a prior art division apparatus, high-speed division operation is made possible by the invention.

With the third and fourth embodiments described above, it is necessary to use a squarer and a quadrupler as additional circuit elements. However since with each of these embodiments the computation operands used in each of the steps 2 to 6 are not obtained from the immediately preceding step, the multiplier can be formed with a pipeline configuration. If this is done, the execution time required for each multiplication operation can be effectively halved. In this case the processing times required for successive portions of the processing sequence, expressed in terms of multiplication operations, are as follows:

For step 1 : equivalent to 0.5 multiplication time.

For steps 2 through 5 : equivalent to 0.5 multiplication time.

For steps 6, 7 : equivalent to 1 multiplication time.

Thus, a further increase in division speed can be attained with this embodiment, with the overall processing time to obtain a quotient being equivalent to 4.5 successive multiplication operations. It can thus be understood that by comparison with a prior art convergence division apparatus employing the method described hereinabove, whereby 11 multiplication operations and one subtraction operation are required (so that the total processing time is equivalent to 11.5 multiplication operations), the method of the present invention enables an improvement in speed of approximately 1.5 to 2.5 times. This is achieved simply by the addition of a small number of circuit elements to a prior art division apparatus.

With each of the approximation expansion formulas of the embodiments of the present invention described hereinabove, a subtraction operation is executed to obtain the difference $D_1$ between the divisor D and the approximation value $D_0$. That is to say, instead of obtaining the difference $D_1$ directly, by utilizing the numeric value of the low order $(N-M)$ digits of the divisor D to obtain $D_1$, the subtraction operations $(1-D_1)$ are employed. Thus, each of these embodiments requires a subtractor. However with a binary number system, it becomes possible to use approximation value $D'_1$ whose high order M digits are identical to those of the divisor D and whose low order $(N-M)$ digits are all equal to 1. In this case it would not be necessary to use a subtractor. Fifth through seventh embodiments of the present invention will be described in the following which are based upon this concept.

Figure 5:
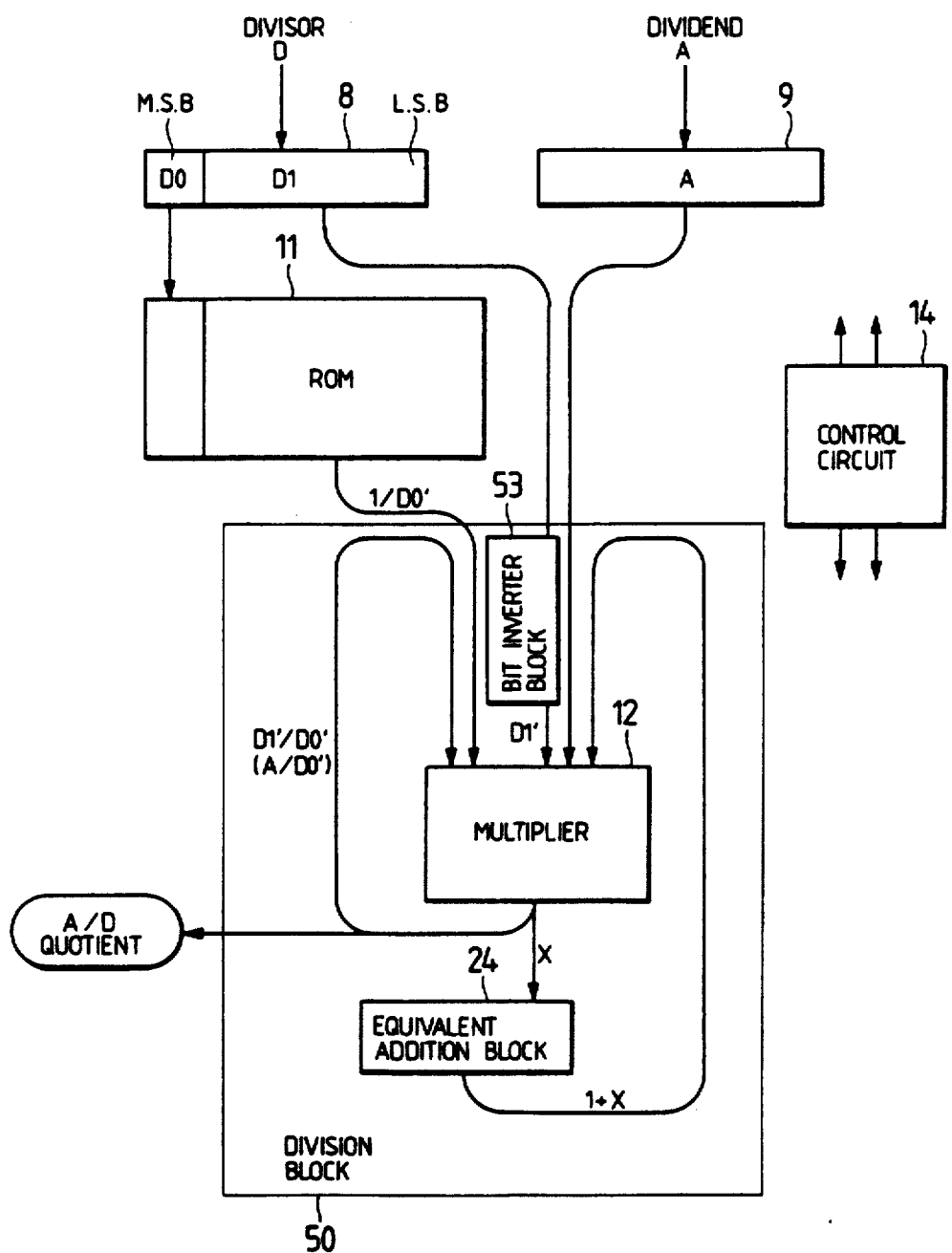

FIG. 5 shows the general configuration of a fifth embodiment of a division apparatus according to the present invention. In this, a high speed convergence division circuit block 50 includes, in addition to a multiplier 12, a subtractor 13, a equivalent addition block 24 (functioning to add 1 to the most significant digit of a small number, as described hereinabove for the 2nd embodiment), and an inverter block 53. The overall processing sequence described below is controlled by a controller 14. Circuit blocks identical to those of the preceding embodiments are indicated by corresponding reference numerals, and further description will be omitted. In this embodiment, $D_0$ and $D_1$ are respectively defined in the same way as described for the preceding embodiments. However for each of the possible values of $D_0$, a corresponding inverse value $1/D_0'$ is stored in a table in ROM 11, where $D_0'$ is a value having all of the high order M digits identical to those of the divisor D and having all of the $(N-M)$ low order digits equal to 1. The value of the divisor D is related to $D_0'$ and to a value $D_1'$, as follows:

$$D = D_0' - D_1' = D_0'(1-(D_1'/D_0'))$$

where $D_1'/D_0' << 1$.

$D_1'$ is a number in which all of the M high order digits (i.e. bits) are zero, and each of the low order $(N-M)$ digits is the inverse of the corresponding digit of the divisor D. Since all of the low order $(N-M)$ digits of $D_0'$ are 1, the low order $(N-M)$ digits of $D_1'$ are obtained by inverting each of the $(N-M)$ low order digits of the divisor D, while all of the M high order digits of $D_1'$ are made equal to 1. In this way it becomes unnecessary to use a subtractor for obtaining the difference $D_1$ between the divisor D and the approximation value $D_0$, such as is necessary with the first through fourth embodiments described above. The approximation equation (7) used for the fifth embodiment is as follows:

$$A/D = A/(D_0' - D_1') = (A/D_0')/(1 - (D_1'/D_0')) \quad (7)$$
$$= (A/D_0')(1 + (D_1'/D_0'))(1 + (D_1'/D_0')^2)(1 + (D_1'/D_0')^4)$$

It will be assumed in the following that numeric values are expressed in binary, with each numeric value consisting of 52 effective digits, and with the 12 high order bits of $D_0$ being assumed for example to be the 12 high order digits of the divisor D (i.e. with M equal to 12) and the remaining digits of $D_0$ being zero, as described hereinabove. Thus, the number of possible values for $D_0'$ is $2^{11}$ i.e. 2048, so that the ROM 11 must have a storage capacity of approximately 100 K bits. The sequence of operating steps for executing a division operation by this embodiment is as follows:

1. Access the ROM 11 in accordance with the high order (M−1) digits of $D_0$, to read out data representing the inverse value $1/D_0'$ corresponding to the divisor D. (Step 1).

2. Multiply this value $1D_0'$ by the value $D_1'$ is is formed using the inverted low order (N−M) digits of the divisor D as described hereinabove. $D_1$ is the register 8, through the bit inverter block 53. The product $D_1'/D_0'$ (i.e. $(D_1'/D_0')$) is thereby obtained. (Step 2)

3. Multiply $1/D_0'$ and the divisor A, by the multiplier 12, to obtain $A/D_0'$. (Step 3)

4. Compute the value $(D_1'/D_0')^2$, by the multiplier 12. (Step 4)

5. Obtain the sum $(1+(D_1'/D_0'))$, by the equivalent addition block 24. The computation time involved is negligible. Multiply this value $(1+(D_1'/D_0'))$ and the value $A/D_0$ obtained in step 3, to obtain $(A/D_0').(1+(D_1'/D_0'))$. (Step 5)

6. Using the multiplier 12, obtain the product $(D_1'/D_0')^4$.(Step 6)

7. Compute $(1+(D_1'/D_0)^2)$ by the equivalent addition block 24, then compute the product of this and the value $(A/D_0')(1+(D_1'/D_0'))$ obtained in step 5, to obtain the product:

$(A/D_0)(1+(D_1'/D_0'))(1+(D_1'/D_0)^2)$, using the multiplier 12. (Step 7)

8. Compute the value $(1+(D_1'/D_O')^4)$, using the equivalent addition block 24, and multiply this by the value obtained in step 7, to obtain the product $(A/D_0)(1+(D_1'/D_0'))(1+(D_1'/D_0')^2)(1+(D_1'/D_0')^4)$ using the multiplier 12. (Step 8).

9. Output the result obtained in step 8 as the desired quotient A/D. (Step 9)

It can be understood from the above that the processing steps required to execute computation in accordance with the approximation equation (7) above can be summarized as follows:

Number of 52-digit multiplication operations : 7
Number of 40-digit inversion operations : 1 (time required is effectively zero).
Number of ROM read-out operations: 1 (time required is equivalent to that for 0.5 multiplication operation).

Thus, if the processing times are expressed in terms of multiplication operations, the total time required to execute division is equivalent to 7.5 multiplication operations.

Figure 6:
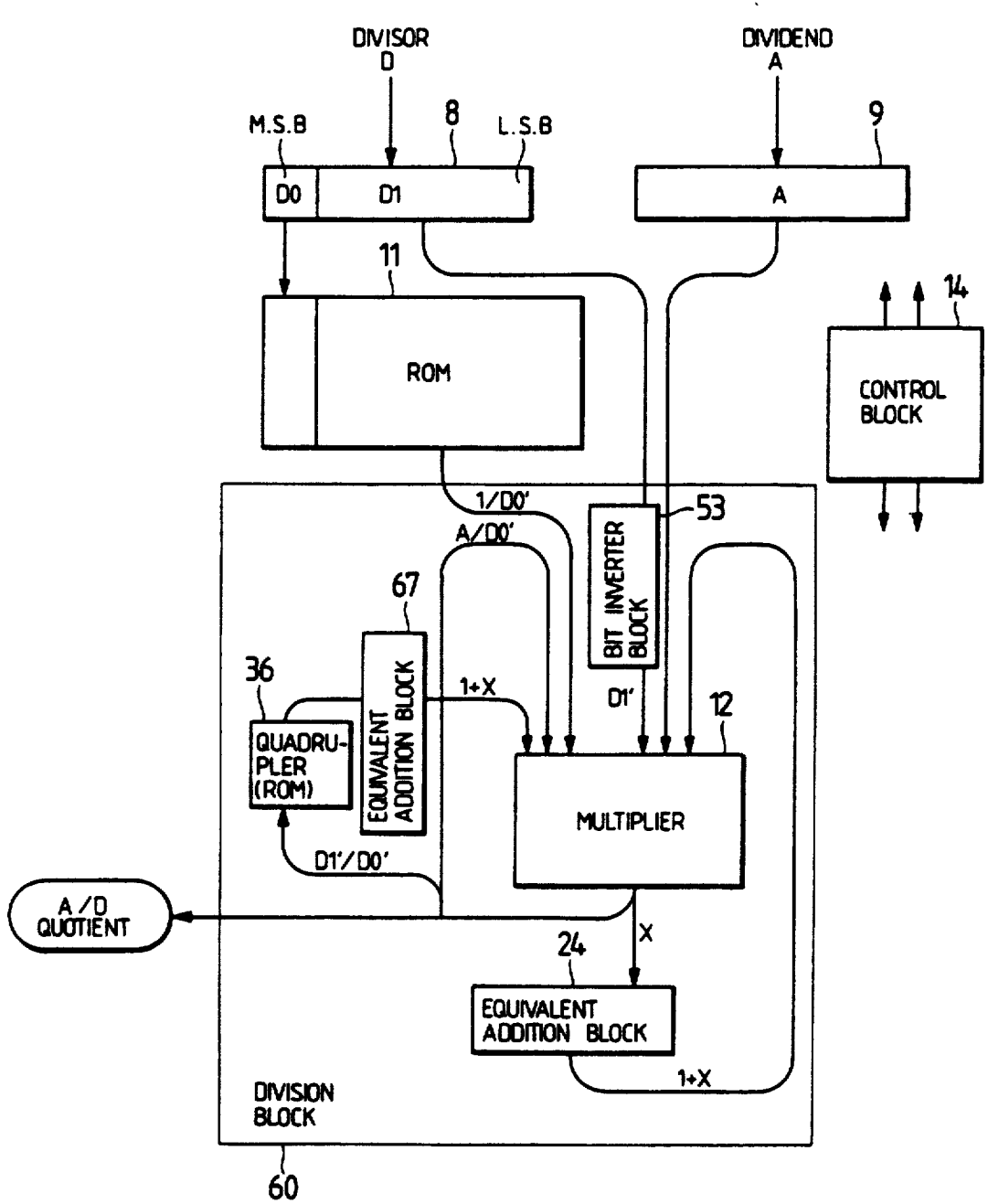

A sixth embodiment of the invention will be described referring to FIG. 6. which also executes division operation based upon the approximation equation (7) used with the sixth embodiment. In addition to the circuit blocks of the fifth embodiment of FIG. 5 described above, the sixth embodiment further includes a quadrupler ROM 66 and a equivalent addition block 67. As shown, the quadrupler ROM 66 can be configured as a ROM having a suitable table of values stored therein. In this embodiment, the ROM quadrupler ROM 66 provides 4-digit precision (i.e. $52-12\times4$). As for the fifth embodiment, the ROM 11 contains a table of inverse values $(1/D_0')$ corresponding to respective values of $D_0$. The operating sequence of this embodiment is as follows:

1. Access the ROM 11 in accordance with the high order (M−1) digits of $D_0$, to read out data representing the inverse value $1/D_0'$ corresponding to the divisor D. (Step 1).

2. With the multiplier 12, multiply this value $1/D_0'$ by the value $D_0'$ ( consisting of the inverted low order (N−M) digits of the divisor D, and obtained by passing $D_1$ through the bit inverter block 53.). The product $D_1'/D_0'$ (i.e. $(D_1'/D_0')$) is thereby obtained. (Step 2)

3. Multiply $1/D_0'$ and the divisor A, by the multiplier 12, to obtain $A/D_0'$. (Step 3)

4. Compute the value $(D_1'/D_0')^2$, by the multiplier 12. (Step 4)

5. Compute $(1+(D_1'/D_0')^4)$, by the quadrupler ROM 66 and the equivalent addition block 67. (Step 5)

6. Compute $(1+(D_1'/Dhd\ 0'))$, by the equivalent addition block 24 (negligible processing time being required for this), then multiply $(1+(D_1'/D_0'))$ by the product $A/D_0'$ obtained in step 3, to thereby obtain the product $(A/D_0')(1+(D_1'/D_0'))$, by the multiplier 12. (Step 6)

7. Compute the value $(1+(D_1'/D_0')^2)$ using the equivalent addition block 24, and multiply this by the value $(1+(D_1'/D_0')^4)$ obtained in step 5, to obtain the product $(1+(D_1'/D_0')^2)(1+(D_1'/D_0')^4)$, by the multiplier 12. (Step 7)

8. Multipy the value $(A/D_0')(1+(D_1'/D_0'))$ by the value $(1+(D_1'/D_0')^2)(1+(D_1'/D_0')^4)$ obtained in step 7, by the multiplier 12, to obtain the product $(A/D_0')(1'(D_1'/D_0'))(1+(D_1'/D_0')^2)(1+(D_1'/D_0\ ')^4)$. (Step 8)

9. Output the result obtained in step 8 as the desired quotient A/D. (Step 9)

It can be understood from the above that the processing steps required with this 6the embodiment to execute computation in accordance with the approximation equation (7) above can be sunmmarized as follows:

Number of 52-digit multiplication operations : 6
Number of 40-digit inversion operations : 1 (time required is efffectively zero).
Number of ROM read-out operations: 1 (time required is equivalent to that for 0.5 multiplication operation).
Number of quadrupling operations (executed by ROM read-out) : 1 (overlapped by multiplication operation).
Thus, if the processing times are expressed in terms of multiplication operations, the total time required to execute division is equivalent to 6.5 multiplication operations.

Figure 7:
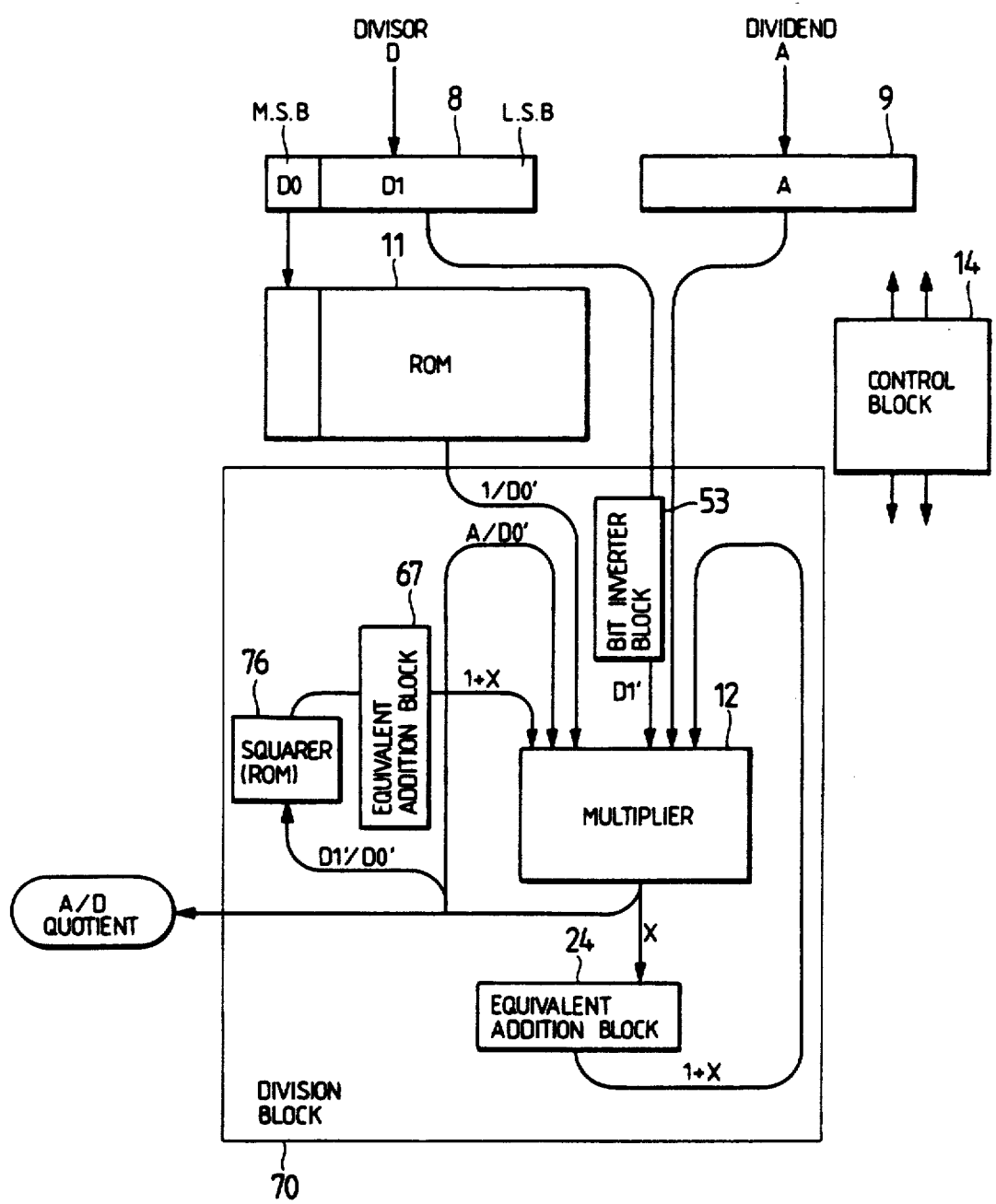

A 7th embodiment of the present invention will be described referring to FIG. 7, whose operation is also based upon the approximation equation (7) above. If the effective number of digits N of the divisor D is sufficiently small, e.g. 24 bits, and M is made equal to 12, then all terms of value $(D_1'/D_0')^3$ or higher in the approximation equation (7) become sufficiently small to be ignored. In this case therefore, it becomes unnecessary to execute a quadrupling operation. The 7th embodiment is based upon this fact, i.e. with this embodiment N is 24 and M is 12. This embodiment differs from that of FIG. 6 in that a squarer ROM 76 is provided in place of the quadrupler ROM 66 of the 6th embodiment. The squarer ROM 76 consists of a ROM containing a table of squared values, which is accessed in accordance with a value that is to be squared. The operating sequence for executing a division operation with this embodiment is as follows:

1. Access the ROM 11 in accordance with the high order (M−1) digits of $D_0$, to read out data representing the inverse value $1/D_0'$ corresponding to the divisor D. (Step 1).

2. With the multiplier 12, multiply this value $1/D_0'$ by the value $D_0'$ ( consisting of the inverted low order (N−M) digits of the divisor D, and obtained by passing $D_1$ through the bit inverter block 53.). The product $D_1'/D_0'$ (i.e. $(D_1'/D_0')$) is thereby obtained. (Step 2)

3. Multiply $1/D_0'$ and the divisor A, by the multiplier 12, to obtain $A/D_0'$. (Step 3)

4. Compute $(1+(D_1'/D_0')^2)$, by the squarer ROM 76 and the equivalent addition block 67. (Step 4)

5. Compute $(1+(D_1'/D_0'))$, by the equivalent addition block 24 (negligible processing time being required for this), then multiply $(1+(D_1'/D_0))$ by the product $A/D_0'$ obtained in step 3, to thereby obtain the product $(A/D_0')(1+(D_1'/D_0))$, by the multiplier 12. (Step 5)

6. Multiply the value $(A/D_0')(1+(D_1'/D_0'))$ obtained in step 5 by the value $(1+(D_1'/D_0')^2)$ obtained in step 4, by the multiplier 12, to obtain the product $(A/D_0')(1+(D_1'/D_0'))(1+(D_1'/D_0')^2)$. (Step 6)

7. Output the result obtained in step 6 as the desired quotient A/D. (Step 7)

It can be thus be understood that the processing steps required with this 7th embodiment can be summarized as follows:

Number of 24-digit multiplication operations : 4

Number of 12-digit inversion operations : 1 (time required is effectively zero).

Number of ROM read-out operations: 1 (time required is equivalent to that for 0.5 multiplication operation).

Number of squaring operations (executed by ROM readout) : 1 (overlapped by multiplication operation).

Thus, if the processing times are expressed in terms of multiplication operations, the total time required to execute division is equivalent to 4.5 multiplication operations.

With the 1st through 7th embodiments of the present invention, as will be clear from the above, each provide a substantial reduction in the time required to execute a division operation. Each embodiment can be implemented simply by adding to a conventional division apparatus a ROM containing a table of inverse values stored therein, together with a few other additional circuit elements such as bit inverters etc.

In the 6th embodiment described above, a quadrupler is used. However, as in the case of the 3rd and 4th embodiments described above, the operands used in certain processing steps (2 to 7) are not derived by a multiplication operation executed in the immediately preceding step, so that if the multiplier 12 has a 2-stage pipeline configuration, the multiplication execution time can be effectively halved. Thus, the times required for the various steps of a division operation become as follows:

Step 1 : equivalent to 0.5 times the time for a multiplication operation.

Steps 2 to 5 : each equivalent to 0.5 times the time for a multiplication operation.

Steps 7, 8 : each equivalent to the time for one multiplication operation.

Thus, the overall time required for a division operation is equivalent to 4.5 times that of a multiplication operation, so that very high-speed execution can be achieved.

Since with the prior art convergence division method described above the total division execution time is equivalent to 11.5 multiplication operations (i.e. 11 multiplication operations and one addition operation), it can be understood that the present invention enables an improvement in division processing speed by a factor of 1.5 to 2.5 times to be achieved.

What is claimed is:

1. A division apparatus for dividing a dividend A by a divisor D, each said divisor and dividend being a normalized numeric value expressed in a base R numeric system and having N effective digits, where N is an integer, with the most significant digit of said divisor being other than zero, the apparatus comprising:

means for deriving a first approximation value $D_0$ for said divisor D, where M high order digits of said value $D_0$ are respectively identical to M high order digits of said divisor and (N−M) low order digits of said value $D_0$ are each of identical predetermined fixed value and where M is an integer which is greater than zero and less than N, and a value $D_1$ which is the difference between said divisor D and said first approximation value $D_0$;

memory means having stored therein a table comprising (R-1)·$R^{(M-1)}$ inverse values corresponding respectively to all possible values of said first approximation value $D_0$;

control means accessing said inverse value table in accordance with a value represented by said high order M digits of said divisor, to produce as output from said memory means a corresponding one of said inverse values and, high-speed convergence division means coupled to receive said corresponding inverse value, said value $D_1$, and said dividend A, and comprising at least multiplier means having a computation precision corresponding to at least N effective digits wherein said control means further controls said convergence division means to execute successive digital processing steps in accordance with a predetermined convergence division algorithm for obtaining a division quotient A/D.

2. A division apparatus according to claim 1, in which each of said inverse values is a direct inverse value $1D_0$ or a corresponding approximation value $D_0$, and in which said high-speed convergence division means comprises multiplication means and subtraction means, each said multiplication means and subtraction means having a computation precision extending to at least N valid digits, said convergence division means;

computes a product $D_1/D_0$ of said value $D_1$ and said inverse value $1/D_0$, by said multiplication means;

subtracts said product $D_1/D_0$ from one to obtain a difference $(1-D_1/D_0)$, by said subtraction means;

multiplies the value $(1-D_1/D_0)$ by $D_1/D_0$, by said multiplication means for a predetermined number of times;

subtracts the value $\{(1-D_1/D_0)(D_1/D_0)\}$ from one by said subtraction means for a predetermined number of times;

computes a product $(A/D_0)$ of said dividend A and said inverse value $1/D_0$, by said multiplication means;

multiplies said product $A/D_0$ with a final value of $\{(1-\{(1-D_1/D_0)(D_1/D_0)\}\}$, by said multiplication means, and outputs a result obtained thereby as said division quotient A/D.

3. A division apparatus according to claim 1, in which the low order (N−M) digits of said approximation value $D_0$ are each fixed as zero, and in which each of said inverse values is an inverse value $1/((D_0+d))$ with respect to a corresponding approximation value $D_0$, where d is a value having N valid digits with the $M^{th}$ digit from the most significant digit thereof being equal to one and all other digits thereof being equal to zero, and in which said high-speed convergence division means comprises addition means, multiplication means and subtraction means, each said multiplication means and subtraction means having a computation precision extending to at least N valid digits, said convergence division means:

computes a difference $(d-D_1)$, by said subtraction means;

multiplies the value of said difference $(d-D_1)$ by said inverse value $1/(D_0+d)$ to obtain a value $(d-D_1)/(D_0+d)$, by said multiplication means for a predetermined number of times;

adds one to the value $(d-D_1)/(D_0+d)$ to obtain a sum $\{1+(d-D_1)/(D_0+D)\}$, by said addition means for a predetermined number of times;

multiplies said product $\{(d-D_1)\}/\{(D_0+d)\}$ by the value $\{1+(d-D_1)/(D_0+d)\}$, by said multiplication means for a determined number of times;

computes a product $A/\{(D_0+D0\}$ of said dividend A and said inverse value $1/\{(D_0+d)\}$, by said multiplication means;

multiplies said product $A/\{(D_0+d)\}$ with a final value of $\{(d-D_1)\}/\{(D_0+d)\}\{1+(d-D_1)/(D_0+d)\}$, by said multiplication means, and outputs a result obtained thereby as said division quotient A/D.

4. A division apparatus according to claim 1, in which each of said inverse values is a direct inverse value $1D_0$ of a corresponding approximation value $D_0$, and in which said high-speed convergence division means comprises multiplication means and subtraction means, each said multiplication means and subtraction means having a computation precision extending to at least N valid digits, addition means, squarer means for producing the square of a numeric value inputted thereto, and quadrupler means for producing the fourth power of a numeric value inputted thereto, said convergence division means;

computes a product $D_1/D_0$ of said value $D_1$ and said inverse value $D_0$, by said multiplication means;

computes a product $A/D_0$ of said dividend A and said inverse value $D_0$, by said multiplication means;

derives the square $(D_1^2)/(D_0^2)$ of said product $D_1/D_0$, by said squarer means, and derives the fourth power $D_1^4/D_0^4$ of said product $D_1/D_0$, by said quadrupler means;

computes a difference $(1-D_1/D_0)$ by said subtraction means;

adds one to said square to obtain a sum $\{(1+(D_1^2)/(D_0^2)\}$, and adds one to said fourth power to obtain a sum $(1+D_1^4/D_0^4)$, by said addition means;

multiplies said sum $\{(1+(D_1^2)/(D_0^2)\}$ by said difference $(1-D_1/D_0\cdot(1+D_1^2)/(D_0^2)\}$, by said multiplication means;

multiplies said product $A/D_0$ by said sum $(1+D_1^4/D_0^4)$, by said multiplication means, to obtain a product $(A/D_0\cdot(1+D_1^4/D_0^4)$;

multiplies said product $\{(1-D_1/D_0\cdot(1+(D_1^2)/(D_0^2)\}$ by said product $(A/D_0\cdot(1+D_1^4/D_0^4)$, by said multiplication means, to obtain a final product $\{(A/D_0\cdot(1+D_1^4/D_0^4)\}\cdot\{(1-D_1/D_0\cdot(1+(D_1^2)/(_0^2)\}$, and outputs said final product as said division quotient A/D.

5. A division apparatus according to claim 1, in which each of (N−M) low order digits of said approximation value $D_0$ is zero, and which each of said inverse values is an inverse value $1/\{(D_0+d)\}$ with respect to a corresponding approximation value $D_0$, where d is a value having N valid digits with the Mth digit from the most significant digit thereof being equal to one and all other digits thereof being equal to zero, and in which said high-speed convergence division means comprises multiplication means and subtraction means, each said multiplication means and subtraction means having a computation precision extending to at least N valid digits, addition means ,squarer means for producing the square of a numeric value inputted thereto, and quadrupler means for producing the fourth power of a numeric value inputted thereto, said conversion division means:

computes a difference $(d-D_1)$ of said value and said value $D_1$, by said subtraction means;

computes a product $\{(d-D_1)\}/\{(D_0+d)\}$ of said difference $(d-D_1)$ and said inverse value $1/D_0+d)$, by said multiplication means, computes a product $A/(D_0+d)$ of said dividend A and said inverse value $1/(D_0+d)$ of said multiplication means;

derives the square $(d-D_1)^2/(D_0+d)^2$ of said product $(d-D_1)/(D_0+d)$, by said squarer means, and derives the fourth power $(d-D_1)^4/(D_0+d)^4$ of said product $(d-D_1)/(D_0+d)$, by said quadrupler means;

computes a sum $\{1+(d-D_1)^4/(D_0+d)^4\}$, by said addition means;

computes a product $\{A/(D_0+d)\}\cdot\{1+(d-D_1)^4/(D_0+d)^4\}$, by said multiplication means;

computes a sum $\{1+(d-D_1)/(D_0+d)\}$, by said addition means, computes a product $\{1+(d-D_1)/(D_0+d)\}\cdot\{1+(d-D_1)^2/(D_0+d)^2\}$, by said multiplication means;

computes a final product $\{\{A/\{(D_0+d)\}\}\cdot\{1+(d-D_1)^4/(D_0+d)^4\}\}\cdot\{\{1+(d-D_1)/(D_0+d)\}\cdot\{1+(d-D_1)^2/(D_0+d)^2\}\}$, by said multiplication means, and outputs said final product as said division quotient A/D.

6. A division apparatus according to claim 4 or claim 5, in which at least one of said squarer means and said quadrupler means comprises read-only memory means.

7. A division apparatus according to claim 4 or claim 5, in which operating functions of at least one of said by multiplication operations executed by said multiplication means.

8. A division apparatus according to claim 1, in which each of said divisor and dividend is expressed in binary form and in which each of said inverse values is an inverse value $1/D_0'$ with respect to a corresponding approximation value $D_0$, where $D_0'$ is a value having N valid digits with the M high order digits thereof being respectively identical to the M high order digits of said divisor D and with the (N−M) low order digits thereof each having a value of one, and in which said high-speed convergence division means comprises multiplication means, addition means, and bit inversion means, each said multiplication means and addition means having a computation precision extending to at least N valid digits, said bit inversion means being operable to convert said divisor D to a value $D_1'$, where said value $D_1'$ has the M high order digits thereof each have a value of zero and the (N−M) low order digits thereof each having a value which is the inverse of that of a corresponding digit of said divisor D, said convergence division means;

obtains said value $D_1'$ by said bit inversion means;

computes a product $D_1'/D_0'$ of said inverse value $1/D_0'$ and said value $D_1'$, by said multiplicatio means;

computes a product $A/D_0'$ of said dividend A and said inverse value $1/D_1'$, by said multiplication means;

computes the square $(D_1'/D_0')^2$ of said product $D_1'/D_0'$, by said multiplication means;

computes a sum $\{(1+(D_1'/D_0')^2$ of said said product $D_1'/D_0'$, by said addition means;

computes a product $\{A/D_0'\cdot(1+D_1'/D_0')\}$ of said product $A/D_0'$ and said sum $\{(1+(D_1'/D_0')\}$;

computes the fourth power $(D_1'/D_0')^4$ of said product $D_1'/D_0'$, by squaring said value $(D_1'/D_0')^2$ by said multiplication means;

computes a sum $\{1+(D_1'/D_0')^2)\}$, by said addition means;

computes a product $(A/D_0'\cdot\{1+(D_1'/D_0')\cdot\{1+(D_1'/D_0')^2\}$, by said multiplication means;

computes a sum $\{1+(D_1'/D_0')^4\}$, by said addition means;

computes a final product $(A/D_0'\cdot\{1+(D_1'/D_0')\cdot\{1+(D_1'/D_0')^2\cdot\{1+(D_1'/D_0')^4\}$, by said multiplication means, and outputs said final product as said division quotient A/D.

9. A division apparatus according to claim 1, in which each of said divisor and dividend is expressed in binary form and in which each of said inverse values is an inverse value $1/D_0'$ with respect to a corresponding approximation value $D_0$, where $D_0'$ is a value having N valid digits with the M high order digits thereof being respectively identical to the M high order digits of said divisor D and with the (N−M) low order digits thereof each having a value of one, and in which said high-speed convergence division means comprises multiplication means, addition means, bit inversion means and quadrupler means, each said multiplication means and addition means having a computation precision extending to at least N valid digits, said bit inversion means being operable to convert said divisor D to a value $D_1'$, where said value $D_1'$ has the M high order digits thereof each having a value of one and the (N−M) low order digits thereof each having a value which is the inverse of that of a corresponding digit of said divisor D, and said quadrupler means is operable to produce the fourth power of a numeric value inputted thereof, said convergence division means;

obtain said value $D_1'$ by said bit inversion means;

computes a product $D_1'/D_0'$ of said inverse value $1/D_0'$ and said value $D_1'$, by said multiplication means;

computes a product $A/D_0'$ of said dividend A and said inverse value $1/D_1'$, by said multiplication means;

computes the square $(D_1'/D_0')^2$ of said product $D_1'/D_0'$, by said multiplication means;

obtains a fourth power $(D_1'/D_0')^4$ of said product $D_1'/D_0'$, by said quadrupler means;

computes a sum $\{1+(D_1'/D_0')^4\}$ of one and said fourth power $(D_1'/D_0')$, by said addition means;

computes a sum $\{1+D_1'/D_0')\}$ of one of said product $(D_1'/D_1'/D_0')$, by said addition means;

computes a product $\{A/D'\cdot\{1+(D_1'/D_0')\}$ of said product $A/D_0'$ and said sum $\{1+(D_1'/D_0')\}$;

computes a sum $\{1+(D_1'/D_0')^2\}$, by said addition means;

computes a product $\{1+(D_1'/D_0')^2\cdot\{1+D_1'/D_0')^4\}$ by said multiplication means;

computes a final product $\{A/D_0'\cdot\{1+(D_1'/D_0')\cdot\{1+(dD_1'/D_0')^2\cdot\{1+(D_1'-/D_0')$hu 4$\}$, by said multiplication means, and outputs said final product as said division quotient A/D.

10. A division apparatus according to claim 9, in which said quadrupler means comprises read-only memory means.

11. A division apparatus according to claim 1, in which each of said divisor and dividend is expressed in binary form and in which each of said inverse values is an inverse value $1/D_0$, with respect to a corresponding approximation value $D_0$, where $D_1'$ is a value having N valid digits with the M high order digits thereof being respectively identical to the M high order digits of said divisor D and with the (N−M) low order digits thereof each having a value of one, and in which said high-speed convergence division means comprises multiplication means, addition means, bit inversion means, and squarer means, each said multiplication means and addition means having a computation precision extending to at least N valid digits, said bit inversion means being operable to convert said divisor D to a value $D_1'$, where said value $D_1'$ has the M high order digits thereof each having a value of one and the (N−M) low order digits thereof each having a value which is the inverse of that of a corresponding digit of said divisor D, and said squarer means is operable to produce the square of a numeric value inputted thereof, said convergence division means:

obtains said value $D_1'$ by said bit inversion means;

computes a product $D_1'/D_0'$ of said inverse value $1/D_0'$and said value $D_1'$, by said multiplication means;

computes a product $A/D_0'$of said dividend A and said inverse value $1/D_1'$, by said multiplication means;

computes the square $(D_1'/D_0')^2$ of said product $D_1'/D_0'$, by said squarer means;

computes a sum $\{1+(D_1'/D_0')^2\}$ of said square $(D_1'/D_0')^2$ and one, by said addition means;

computes a sum $\{1+(D_1'/D_0')\}$ of one and said product $(D_1'/D_0')$, by said addition means;

computes a product $\{A/D_0'\}\cdot\{1+(D_1'/D_0')\}$ of said product $A/D_0'$ and said sum $\{1+(D_1'/D_0')\}$;

computes a final product $(A/D_0')\cdot\{1+(D_1'/D_0')\}\cdot\{1+(D_1'/D_0'))^2\}$ by said multiplication means, and outputs said final product as said division quotient $A/D$.

12. A division apparatus according to claim 11, in which said squarer means comprises read-only memory means.

13. A division apparatus according to any one of claims 3, 4, 5, 8, 9 or 11, in which said addition means comprises means for changing the most significant digit of a numeric value inputted thereto from zero to one.

* * * * *